A. J. FREY.
AXLE SKEIN.
APPLICATION FILED APR. 14, 1922.
1,436,493.
Patented Nov. 21, 1922.
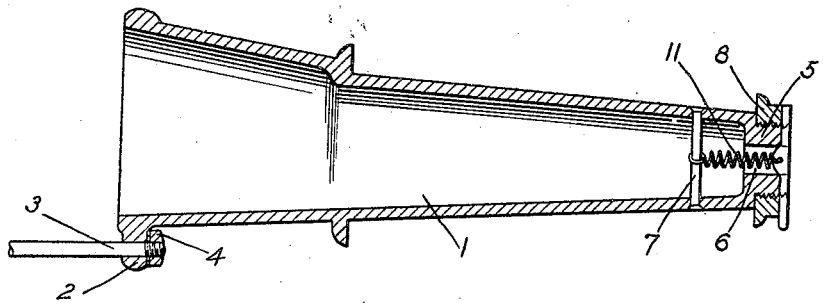
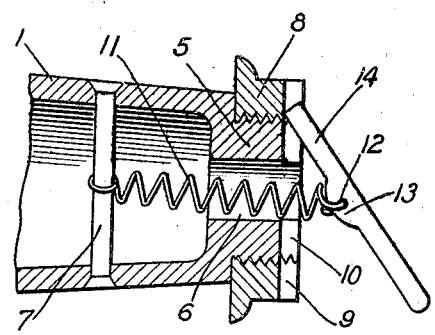
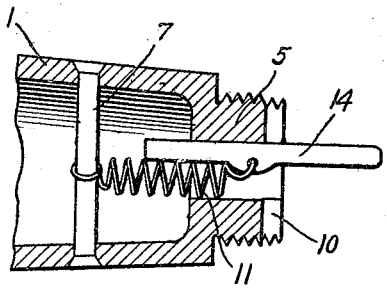
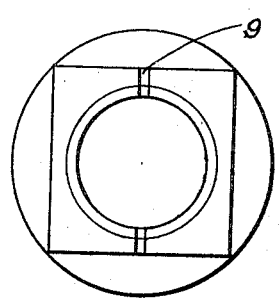
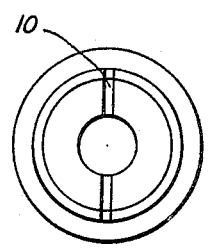
Adolph J. Frey
INVENTOR Patented Nov. 21, 1922.

1,436,493

UNITED STATES PATENT OFFICE.

ADOLPH J. FREY, OF GUIDE ROCK, NEBRASKA.

AXLE SKEIN.

Application filed April 14, 1922. Serial No. 552,729.

*To all whom it may concern:*

Be it known that I, ADOLPH J. FREY, a citizen of the United States, residing at Guide Rock, in the county of Webster and State of Nebraska, have invented new and useful Improvements in Axle Skeins, of which the following is a specification.

My present invention has reference to vehicles, and is directed to axle skeins, and more particularly to a means whereby the nuts are locked on said skeins.

Other objects and advantages will present themselves as the nature of the invention is better understood, reference being had to the drawing which accompanies and which forms part of this application.

In the drawing:—

Figure 1 is an approximately central longitudinal sectional view through an axle skein having a nut locked thereon in accordance with this invention.

Figure 2 is a similar view showing the manner in which the locking key is first brought to unlocking position.

Figure 3 is a view showing the key unlocked from the nut and seated, the nut being removed from the skein.

Figure 4 is a plan view of the nut.

Figure 5 is an end view of the skein.

Referring now to the drawing in detail, the numeral 1 designates an axle skein which is substantially of the ordinary construction. In the present instance, however, I provide the skeins 1 each with an outstanding lug on the inner end thereof. The lug is indicated by the numeral 2, and is preferably arranged on the bottom of the skein. The lugs 2 have openings therethrough for the reception of the threaded ends of a truss rod 3, a nut 4 being threaded on each end of the truss rod. This arrangement effectively secures the skeins on the opposite ends of an axle properly positioned and against independent longitudinal movement.

The skein has its outer end provided with the usual reduced threaded extension 5. In the present instance, I form the said extension with a central opening 6 that, of course, communicates with the bore of the skein. Inward of the wall provided by the extension 5 I bore aligning openings through the skein in which there is received a pin 7, the ends of the pin being flattened or headed to hold the same in the skein.

The cap nut 8 is also of the ordinary construction, and is screwed on the threaded end 5 of the skein 1. However, the cap nut has its outer face provided with grooves or recesses 9 that extend entirely therethrough. In a like manner, the outer end of the threaded extension 5 is provided with similar grooves or recesses 10.

Secured to the pin 7 is one end of a coiled spring 11. The other end of the spring is received through an opening 12 in a boss 13 on the inner edge of a locking key 14. The key 14 is of a length corresponding with the cross sectional diameter of the cap nut 8, and is of a width to be received in the slots or depressions 9 and 10. The spring 11 will hold the key seated. The boss 13 is of a width to contact with the opposed walls of the opening 6. Preferably this opening is of a rectangular form and is of a width corresponding to the width of the boss 13.

In Figure 2, I have illustrated the manner in which the key is first brought to unlocking position, and in Figure 3 I have shown the key seated in the opening 6 and the nut removed from the skein.

It is thought that the foregoing description, when taken in connection with the drawing will fully set forth the construction and advantages of the improvement to those skilled in the art to which such inventions relate, and therefore further detailed description will not be attempted.

Having described the invention, I claim:—

In combination, an axle skein having a reduced threaded end that has its outer surface grooved and that is centrally provided with an opening, a cap nut screwed on the said extension and having its outer face grooved, a pin seated in the grooves of the skein extension and nut for holding the nut from movement, and spring means secured to the pin, passing through the opening in the end of the skein and likewise secured in the skein, as and for the purpose set forth.

In testimony whereof I affix my signature.

ADOLPH J. FREY.